United States Patent [19]

Hansen

[11] Patent Number: 4,801,960
[45] Date of Patent: Jan. 31, 1989

[54] MODE SELECTOR MEMBER AND FINGER RECESS IN A CAMERA

[75] Inventor: David E. Hansen, Fairport, N.Y.

[73] Assignee: Eastman Kodak Company, Rochester, N.Y.

[21] Appl. No.: 143,786

[22] Filed: Jan. 14, 1988

[51] Int. Cl.⁴ ........................ G03B 17/02; G03B 15/05
[52] U.S. Cl. .................................. 354/288; 354/127.1; 354/289.1
[58] Field of Search ............... 354/126, 288, 289.1, 354/127.1, 145.1; D16/1, 6

[56] References Cited

U.S. PATENT DOCUMENTS

| | | | |
|---|---|---|---|
| Des. 271,881 | 12/1983 | Kato | D16/6 |
| D. 284,768 | 7/1986 | Nakayama | D16/1 |
| D. 285,449 | 9/1986 | Soda | D16/6 |
| D. 289,175 | 4/1987 | Noda | D16/1 |
| D. 296,112 | 6/1988 | Goto | D16/1 |
| 3,443,498 | 5/1969 | Bihlmaier | 354/127.1 |
| 4,083,058 | 4/1978 | Iwata et al. | 354/145.1 |
| 4,101,914 | 7/1978 | Yamashita et al. | 354/127.1 |

FOREIGN PATENT DOCUMENTS 2127164A  4/1984  United Kingdom ............... 354/288

*Primary Examiner*—A. A. Mathews
*Attorney, Agent, or Firm*—Roger A. Fields

[57] ABSTRACT

A mode selector member and a recess are disposed in a relatively close relation on the front face of a camera to enable a finger of the user that operates the mode selector member to be readily transferred from the member to the recess, after the member is moved to a selected position. Thus inadvertent movement of the mode selector member from the selected position to an erroneous position, during picture-taking, will be prevented.

1 Claim, 1 Drawing Sheet

MODE SELECTOR MEMBER AND FINGER RECESS IN A CAMERA

CROSS-REFERENCE TO A RELATED APPLICATION

Reference is made to copending, commonly assigned U.S. application Ser. No. 842,015, filed Mar. 6, 1986 in the name of David E. Hansen and entitled DISK FILM CAMERA.

BACKGROUND OF THE INVENTION

1. Field of the Invention

The invention relates generally to the field of photography, and more particularly to the combination of a mode selector member and a finger recess on the front face of a camera.

2. Description of the Prior Art

Sometimes a camera is provided with a mode selector slide on its front face which is manually movable from an original position to another position to uncover a taking lens and/or to energize a control circuit, or is manually movable from a non-flash position to a flash position to energize a firing circuit for an electronic flash. A problem in either instance is that the user of such a camera may inadvertently move the mode selector slide to an erroneous position before taking a picture. When gripping the camera to take a picture, the finger of the user that operated the mode selector slide may remain on the slide. Thus the slide may be inadvertently moved to unintendedly energize the firing circuit for the electronic flash, etc.

THE CROSS-REFERENCED APPLICATION

The application cross-referenced above discloses a disk film camera having a finger recess diagonally extending across the front face of the camera, proximate a corner portion of the front face. A shutter release slide projects outwardly from an opening in the front face. The opening is located remote from the finger recess. In operation, the finger recess is gripped to steady the camera as the shutter release slide is moved to take a picture.

SUMMARY OF THE INVENTION

The invention is believed to solve the above-described problem regarding the inadvertent operation of a mode selector member of a camera.

According to the invention there is provided an improved camera generally of the type wherein a manually actuated member located at a front face of said camera is operated by a finger of the user to initiate at least one function related to the camera, and wherein the improvement comprises:

means defining an elongate recess in said front face for receiving a finger of the user; and means supporting said manually actuated member for manual movement in opposite directions substantially parallel to said elongate recess and relatively close to the recess to enable a finger of the user that operates the member to be readily transferred from the member to the recess, whereby inadvertent movement of the member will prevented.

DESCRIPTION OF THE PREFERRED EMBODIMENT

The invention is described in connection with a 35 mm camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
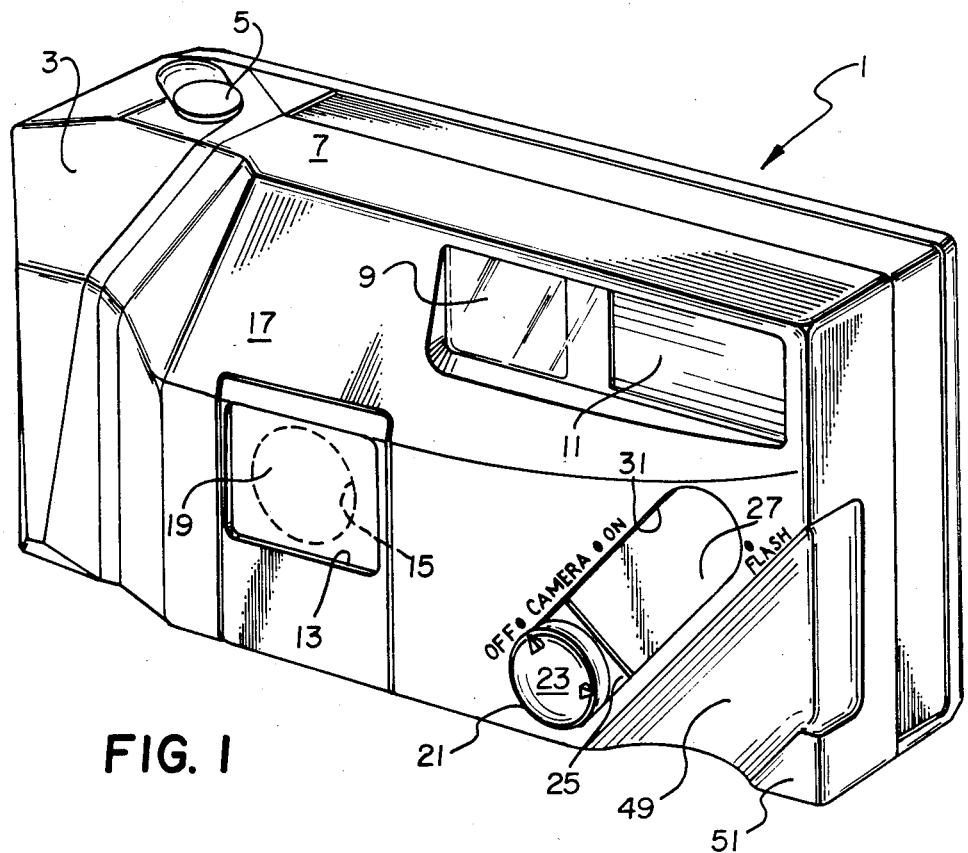
FIG. 1 is a front perspective view of a 35 mm camera including the combination of a mode selector member and a finger recess on the front face of the camera, in accordance with a preferred embodiment of the invention.

Referring now to the drawings and in particular to FIG. 1, a 35 mm camera 1 has a camera body 3. A depressible shutter release button 5 is located at a top side 7 of the camera body 3. A viewfinder window 9, a flash window 11 (for an electronic flash), and an opening 13 for a taking lens 15 are located on a front face 17 of the camera body 3. Normally, as shown in FIG. 1, a lens cover 19 is disposed across the opening 13 to protect the taking lens 15. The lens cover 19 is mounted for sliding movement behind the camera body 3 to uncover the taking lens 15.

Figure 2:
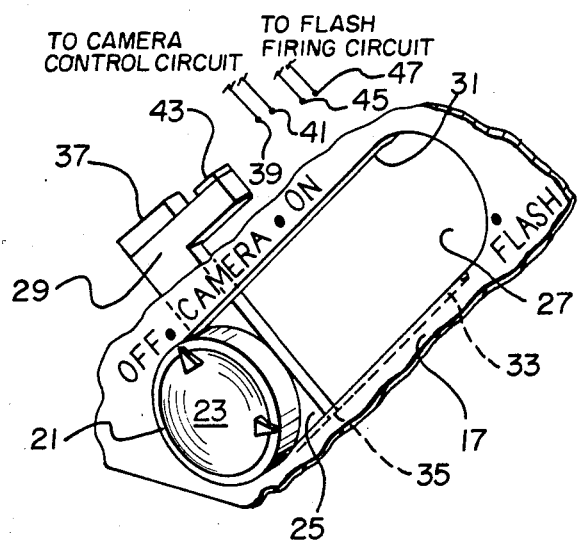
FIG. 2 is a front perspective view similar to FIG. 2, showing certain details of the mode selector member.

A manually actuated slide member 21 comprising a mode selector button 23 and an integral slide base 25 is disposed within a channel 27 in the front face 17 of the camera body 3, for manual movement between "OFF", "ON", and "FLASH" positions. The slide member 21 is supported for such movement, as shown in FIG. 2, by the combination of a rigid switch element 29 which extends from the slide base 25 through a slot 31 along one side of the channel 27 and a groove 33 which extends along an opposite side of the channel to receive a longitudinal edge 35 of the slide base. When the slide member 21 is moved generally to the right in FIG. 2 from its OFF position to its ON position, a relatively long conductive strip 37 on the switch element 29 will be moved to initially bridge two spaced contacts 39 and 41 leading to a known camera control circuit, not shown, to energize the circuit preparatory to picture-taking. In addition, the lens cover 19 will be moved by conventional linkage, not shown, connecting the lens cover and the slide base 25, to uncover the taking lens 15.

If a flash picture is desired, the slide member 21 is further moved to the right in FIG. 2 from its ON position to its FLASH position, to move a relatively short conductive strip 43 on the switch element 29 to bridge two spaced contacts 45 and 47 leading to a known flash firing circuit, not shown, to energize the circuit. At this time, the camera control circuit remains energized because the conductive strip 43 continues to bridge the contacts 39 and 41.

A finger recess 49 is formed in the front face 17 of the camera body 3, as shown in FIG. 1. The finger recess 49 extends diagonally across the front face 17, proximate a corner portion 51 of the front face. Similarly, the channel 27 in which the slide member 21 is manually moved extends diagonally across the front face 17, in a relatively close parallel relation with the finger recess 49.

OPERATION

Typically, the slide member 21 is pushed by a finger of the user from its OFF position either to its ON position or to its FLASH position. Then the same finger is transferred from the slide member 21 to the recess 49. Thus inadvertent movement of the slide member 21 from the selected position to an erroneous position, during picture-taking, will be prevented.

The invention has been described with reference to a preferred embodiment. However, it will be appreciated that variations and modifications can be effected within the ordinary skill in the art without departing from the scope of the invention.

I claim:

1. An improved camera of the type wherein a manually actuated member located at a front face of a camera body is operated by a finger of the user to initiate at least one function related to said camera, and wherein the improvement comprises:

means defining a single finger-receiving groove in said front face which is arranged completely diagonally across a corner portion of the front face to bridge two sides of said camera body; and means supporting said manually actuated member for manual movement in opposite directions along a channel in said front face which extends substantially parallel and relatively close to said finger-receiving groove, though is separated from the groove, for enabling a finger of the user that operates the member to be readily transferred from the member to within the groove, whereby inadvertent movement of the member will prevented.

* * * * *